(12) United States Patent
Barnes

(10) Patent No.: US 9,926,917 B2
(45) Date of Patent: Mar. 27, 2018

(54) OSCILLATING APPENDAGE WITH AUTOMATED PRIME MOVER FOR POWER GENERATION

(71) Applicant: Antoine D'Angelo Barnes, Saint Louis, MO (US)

(72) Inventor: Antoine D'Angelo Barnes, Saint Louis, MO (US)

(73) Assignee: Antoine D'Angelo Barnes, Saint Louis, MO (US)

( * ) Notice: Subject to any disclaimer, the term of this patent is extended or adjusted under 35 U.S.C. 154(b) by 0 days.

(21) Appl. No.: 14/838,334

(22) Filed: Aug. 27, 2015

(65) Prior Publication Data

US 2017/0063197 A1  Mar. 2, 2017

(51) Int. Cl.
| | |
|---|---|
| *H02K 7/18* | (2006.01) |
| *F03G 3/06* | (2006.01) |
| *H02K 53/00* | (2006.01) |
| *F03G 7/10* | (2006.01) |
| *F03G 7/08* | (2006.01) |
| *F03G 3/00* | (2006.01) |

(52) U.S. Cl.
CPC ............. *F03G 3/06* (2013.01); *H02K 7/1892* (2013.01); *H02K 53/00* (2013.01); *F03G 3/00* (2013.01); *F03G 7/08* (2013.01); *F03G 7/10* (2013.01); *Y10S 74/09* (2013.01)

(58) Field of Classification Search
CPC . H02K 7/1807; F03G 3/06; F03G 7/10; Y10S 74/09
See application file for complete search history.

(56) References Cited

U.S. PATENT DOCUMENTS

| | | | | | |
|---|---|---|---|---|---|
| 3,090,273 | A | * | 5/1963 | Fox | A63G 9/00 |
| | | | | | 446/404 |
| 4,911,429 | A | * | 3/1990 | Ogbu | A47D 13/105 |
| | | | | | 297/273 |
| 5,833,545 | A | * | 11/1998 | Pinch | A47D 13/105 |
| | | | | | 297/273 |
| 6,875,118 | B1 | * | 4/2005 | Checketts | A63G 9/16 |
| | | | | | 472/119 |
| 7,005,757 | B2 | * | 2/2006 | Pandian | F03G 5/06 |
| | | | | | 290/1 R |
| 2015/0233359 | A1 | * | 8/2015 | Holt | F03G 3/06 |
| | | | | | 60/698 |

OTHER PUBLICATIONS

Cleveland Motley, "The Swing Set That Generates Electricity", May 21, 2011, http://www.instructables.com/id/A-Swing-Set-that-Generates-Electricity, included YouTube video http://www.youtube.com/watch?v=9c1W6MkAjUU.*

* cited by examiner

*Primary Examiner* — Michael Zarroli

(57) ABSTRACT

Society today is heavily dependent on electricity for everyday life. There are many different types of electrical generators. The present invention uses the concept of a conventional swing to produce electricity. On a conventional swing, humans are the prime movers, keeping the swing in motion by body movements and pumping the legs. The present invention produces rotation in a generator by operating a prime mover that mimics these human movements on a conventional swing. In the present invention, a mechanized prime Mover, in human form, takes the place of a person's body movements to keep the swing in motion.

1 Claim, 10 Drawing Sheets

OSCILLATING APPENDAGE WITH AUTOMATED PRIME MOVER FOR POWER GENERATION

BACKGROUND OF THE INVENTION

There are many ways of producing electricity today such as solar, wind, hydro, coal, and combustion engines. Wind, water, coal, and gasoline are used to transfer mechanical energy to rotate generators to produce electricity. These devices will not produce rotation in the generator if the fuel or resources required are not available.

The present invention relates to the generation of power through means that does not require fossil fuels, solar, or wind.

SUMMARY OF THE INVENTION

The present invention includes an oscillating appendage connected to an automated prime mover mechanism. The prime mover powers the swing such as a human would power a conventional swing and houses a mechanism that produces specific movements when the appendage is oscillated. The appendage and the prime mover work in tandem producing oscillations that mechanically turn a gearing system to rotate a generator automatically and continuously.

BRIEF DESCRIPTION OF DIFFERENT VIEWS OF DRAWINGS

Figure 1:
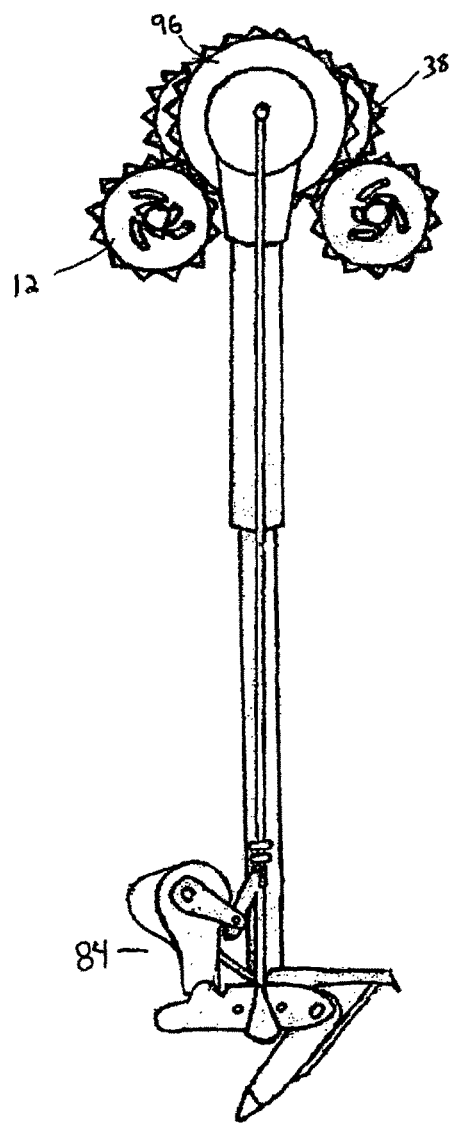
Figure 2:
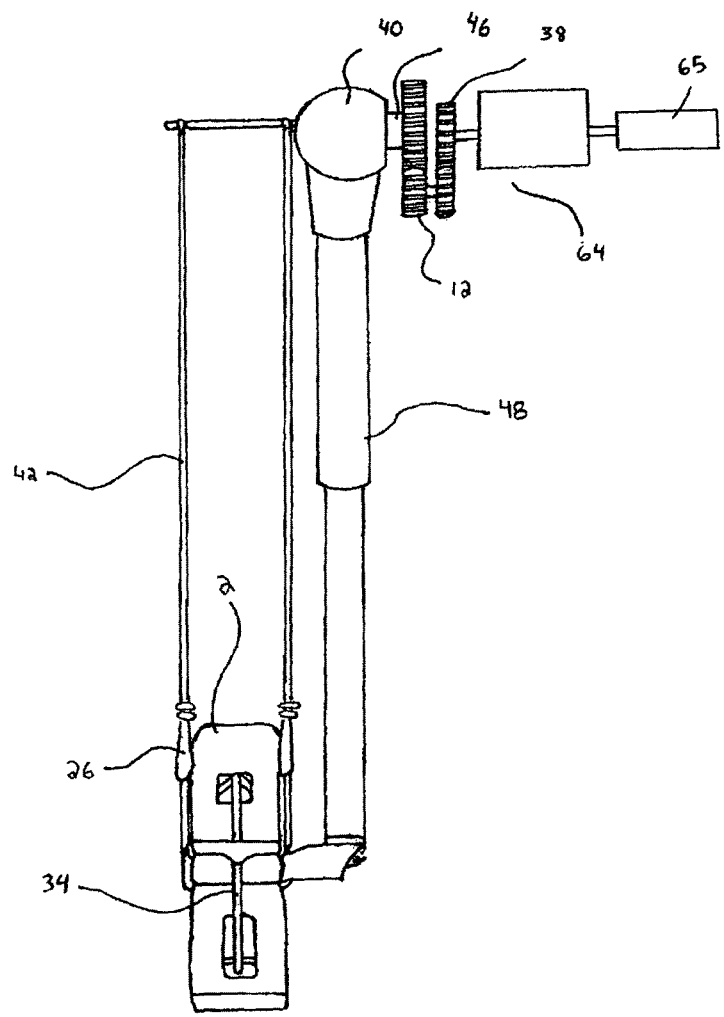
Figure 3:
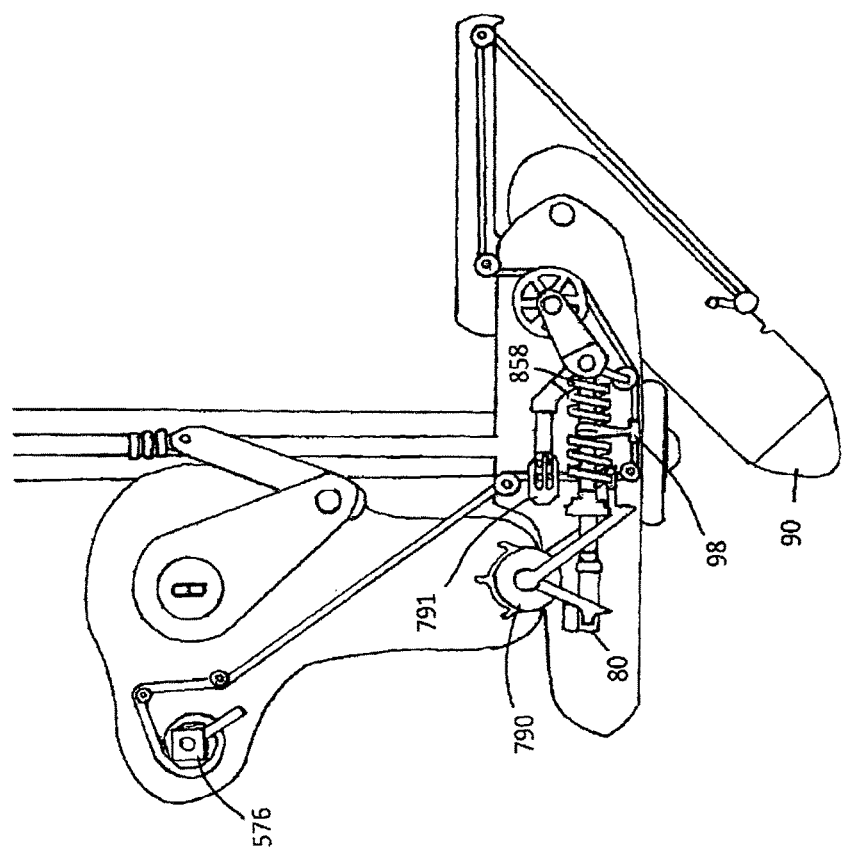
Figure 4:
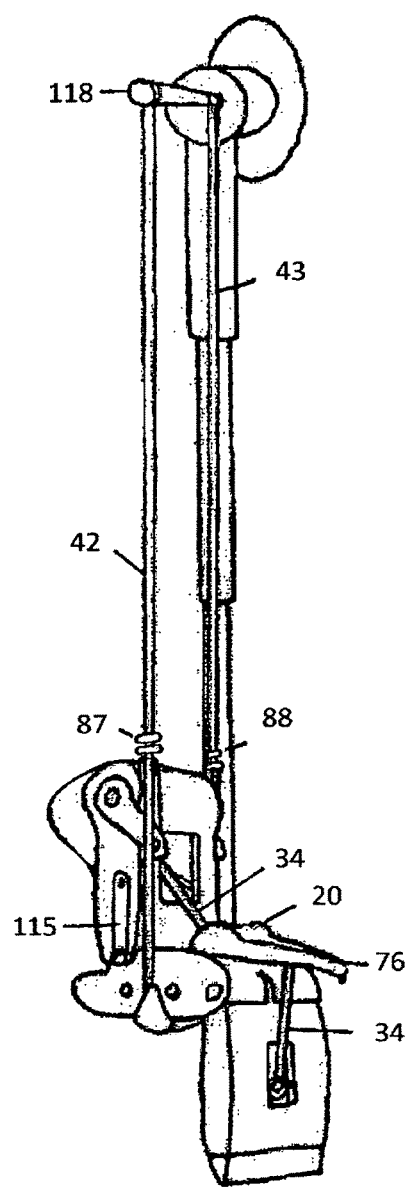
Figure 5:
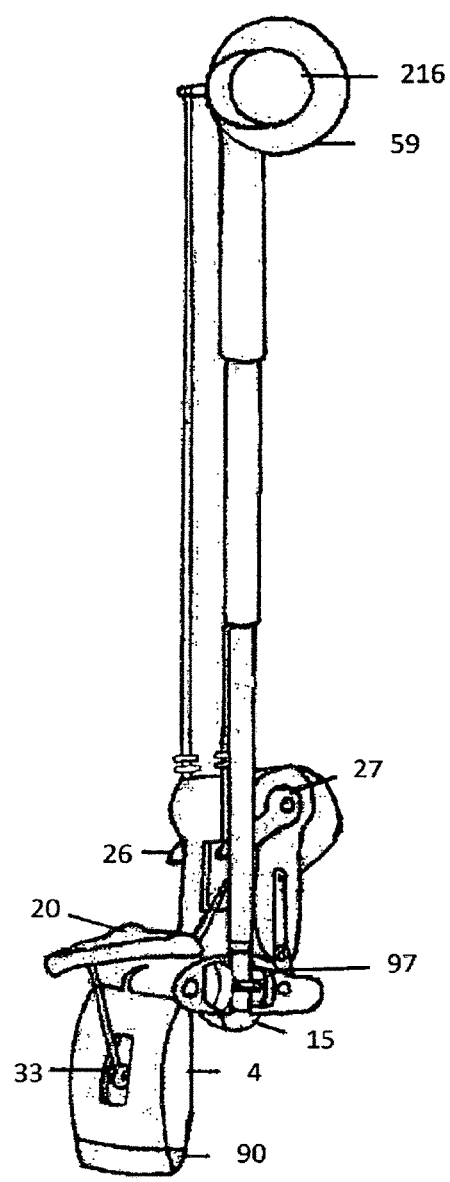
Figure 6:
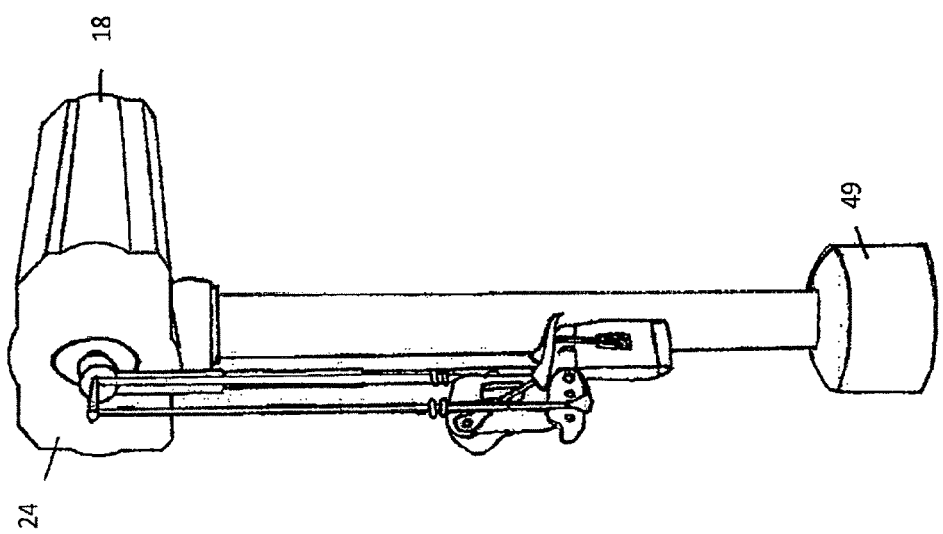
Figure 7:
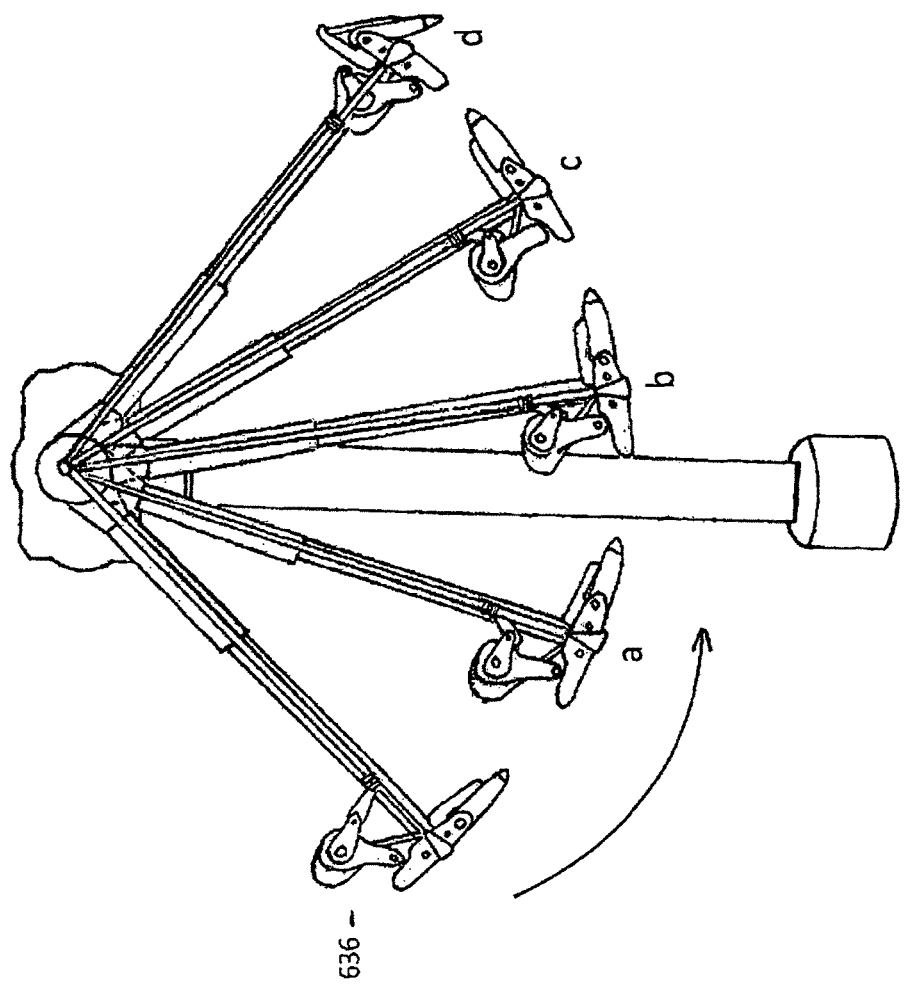

FIG. 1 the embodiment of the side view of the prime mover and front view of the gear face FIG. 2 the embodiment of the side view of the gears, oscillating appendage, and front view of the prime mover with both swing cables in view FIG. 3 the embodiment of the side view prime mover and inner cable/lock mechanism FIG. 4 is the embodiment of a three-dimensional angle view of the front of the prime mover and oscillating appendage FIG. 5 the embodiment of a three-dimensional angle view of the back of the prime mover and oscillating appendage FIG. 6 the embodiment of an angle view of the full apparatus with the base and gear/generator housing FIG. 7 the embodiment of the position of the prime mover and oscillating appendage at the backward apex when the 4 leg is raised by the lock/release cable.

Figure 8:
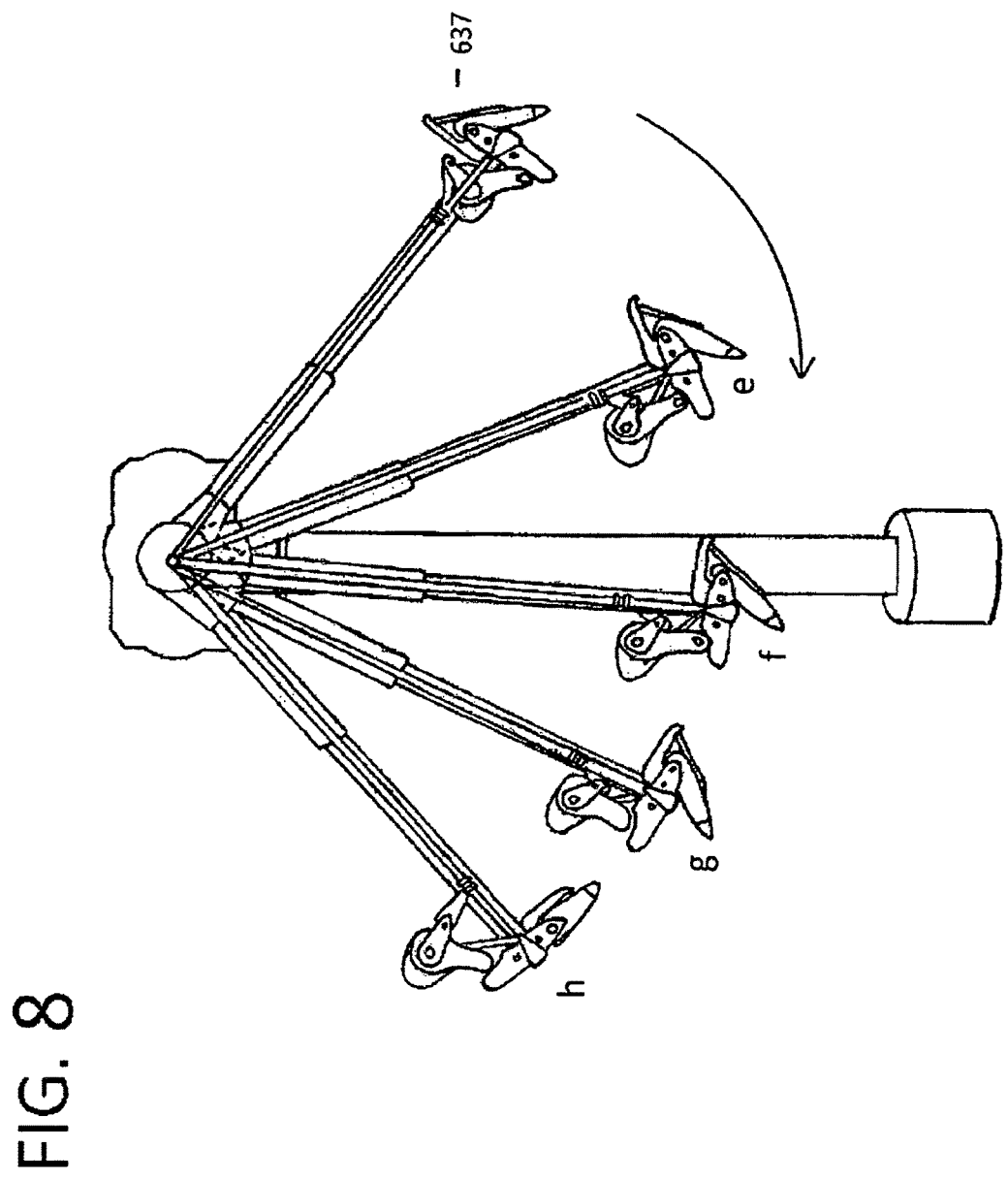

FIG. 8 shows the position of the prime mover and oscillating appendage at the forward apex with the leg is lowered by the releasing of the lock/release cable.

Figure 9:
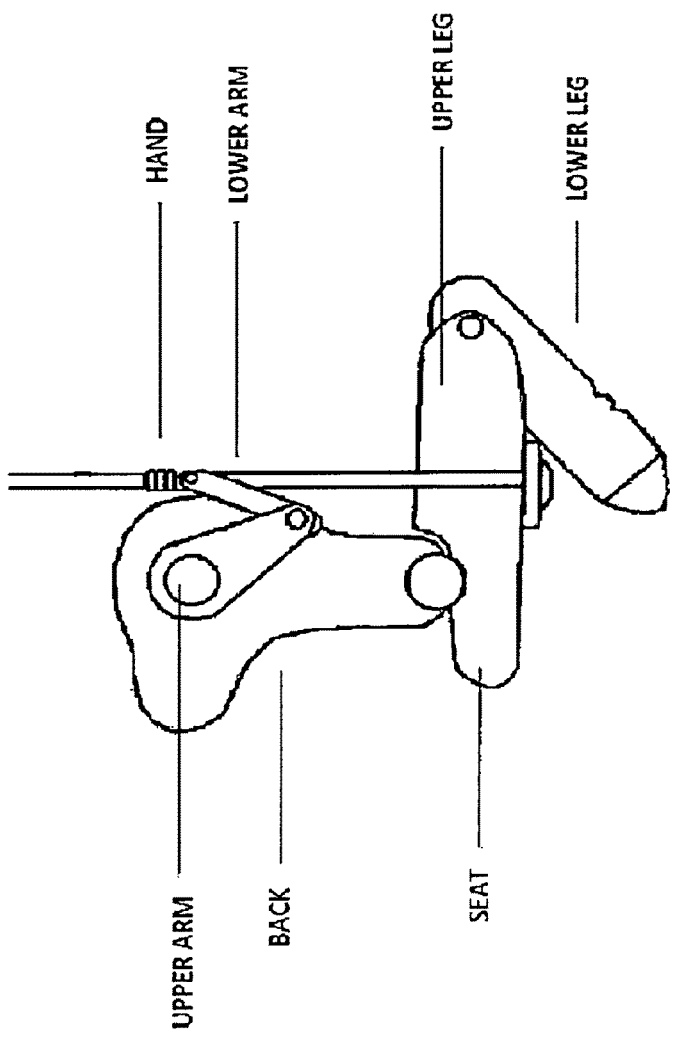

FIG. 9 embodiment of the prime mover compared to human body proportions.

Figure 10:
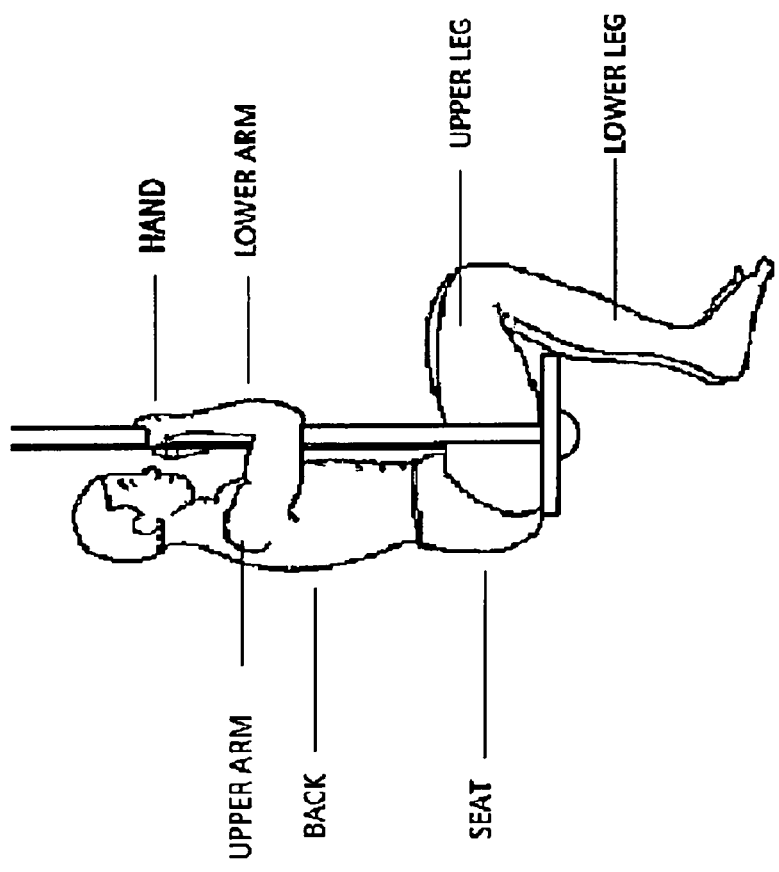

FIG. 10 embodiment of the human body compared to the prime mover proportions.

DESCRIPTION OF INVENTION

FIG. 6 is the embodiment of the full apparatus with the 49 base and 18 gear/generator housing in view. The 24 face of the gear/generator housing holds the 216 fulcrum which supports and centers the 48 oscillating appendage which is connected via the 40 appendage connection and 46 shaft to the 96 main gear that directly contacts the 12 ratchet gears and rotates the 38 minor gears as shown in FIG. 2. The embodiment of the 48 oscillating appendage consists of: the 59 main gear attachment that supports the 48 oscillating appendage that vertically extends down to the 97 seat connector to support the 84 automated prime mover as shown in FIG. 5. The 59 main gear attachment also holds the 118 swing cable support beam. The 118 swing cable support beam goes through the 59 main gear attachment and is connected to the 216 fulcrum. The purpose of the 118 swing cable support beam is to hold the 43 swing cables as it remains stationary. The 43 swing cables extend down vertically to the 15 connectors on the 84 automated prime mover. Referring to FIG. 3 illustrated is the embodiment of the 84 automated prime mover and its main components: 10 seat that is directly attached to the 48 appendage through the 8 seat attachment. The 2 back is also connected to the seat via the 115 hinge. Affixed atop of 10 seat is the 20 cable/lock release housing and 76 extended cable housing over the seat wherein the 33 cable comes out of the underside to raise or lower the 4 leg as the 2 back moves at each apex. The 27 arm and 26 forearm connects to the 87 left and 88 right swing cables connector stop the 2 back as it moves forward and backward on its 115 hinge at the apexes. The movement of the 2 back directly causes the raising or lowering of the 4 leg which also has a 90 weight at the end of it. A motor causes the retraction and extension of the 34 cable within the 791 lock/ release mechanism producing the movements by the 2 back and 4 leg. The movements mimic a human operating a conventional swing. These movements can also be produced from a stopped position by the 80 actuator. As the 2 back moves in a backward direction it pulls the 33 cable leg attachment and raises the 4 leg as illustrated in FIG. 7 the 636 forward apex position as the 576 cable winder holds the excess cable. As the 2 back moves forward the 576 cable winder unwinds the 34 cable and lowers the 4 leg as illustrated in 637 backward apex position of the 84 automated prime mover and 48 oscillating appendage. The 791 cable lock holds the 34 cable forward or in reverse as the 790 back hinge connection locks and unlocks in response to the back and forth motions of the 2 back. The 98 connector links the 33 cable to the 858 spring coils and gives the 4 leg a slight thrust at the beginning of the raising and lowering at the apexes. FIG. 7 is the embodiment of the 84 automated prime mover and 48 oscillating appendage position in sequence starting at the 636 forward apex position continuing the sequence with a, b, c, and d. When the 48 oscillating appendage swings forward and reaches the apex the laws of motion causes the 2 back to continue to move forward engaging the 791 lock/release mechanism lowering the 4 leg leaving the automated 84 prime mover in the 637 position continuing the sequence with e, f, g, and h as shown in FIG. 8. As the 48 oscillating appendage swings backward toward the apex the 2 back keeps moving backward and the 790 back hinge connection engages the cable 791 lock/release raising the 4 leg and starting the motion toward the backward apex. The forward and backward motions of the 48 oscillating appendage are repeated as the laws of motion operate the automated 84 prime mover. These continuous motions engage the gears that turn the 64 gearbox which rotates the 65 generator producing electricity. The electricity produced can be used immediately or stored in batteries for later use.

I claim:
1. A device that produces electrical power comprising:
a mechanism in the design of a pendulum/swing,
comprising a base supporting a bottom portion and a gear/generator housing at the top portion,
the gear/generator housing containing a fulcrum that supports an appendage with the bottom end of the appendage attached to a prime mover, the prime mover body is secured to the appendage by a seat connector, connected to the seat connector is a seat, and atop of the seat at one end is a back, the other end holds a leg, on either side of the back are two arms with connectors on each of the ends of the arms, the connectors grip two vertical swing cables where the bottom ends of each cable are secured to both sides of the seat, the top ends of said cables are both secured by a support beam that is attached to an appendage connector, comprised within the seat is mounted an actuator powered cable lock and release mechanism, the cable in the cable lock and release mechanism is connected at one end to the back, and the leg is connected at the other end of this cable, a powered extension and retraction of an actuator rod directly causes the back and leg to move in tandem, producing movements mimicking a human operating a conventional swing, these movements cause the pendulum/swing to move forwards and backwards.

\* \* \* \* \*